G. A. BJORNSON.
MOTOR WHEEL.
APPLICATION FILED DEC. 15, 1915.

1,198,410.

Patented Sept. 19, 1916.
5 SHEETS—SHEET 1.

WITNESSES

INVENTOR
Gustaf A. Bjornson

BY
ATTORNEY

G. A. BJORNSON.
MOTOR WHEEL.
APPLICATION FILED DEC. 15, 1915.

1,198,410.

Patented Sept. 19, 1916.
5 SHEETS—SHEET 2.

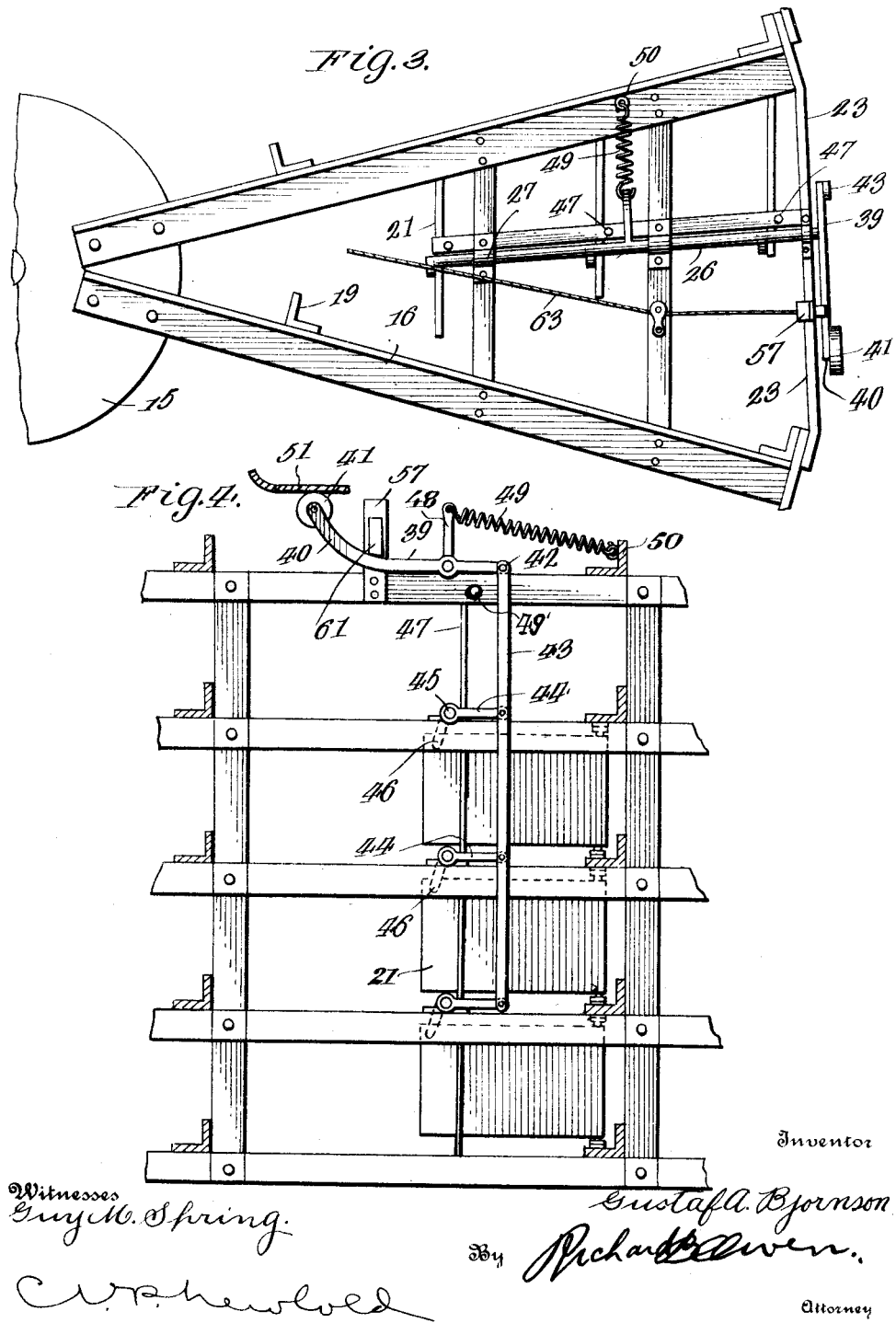

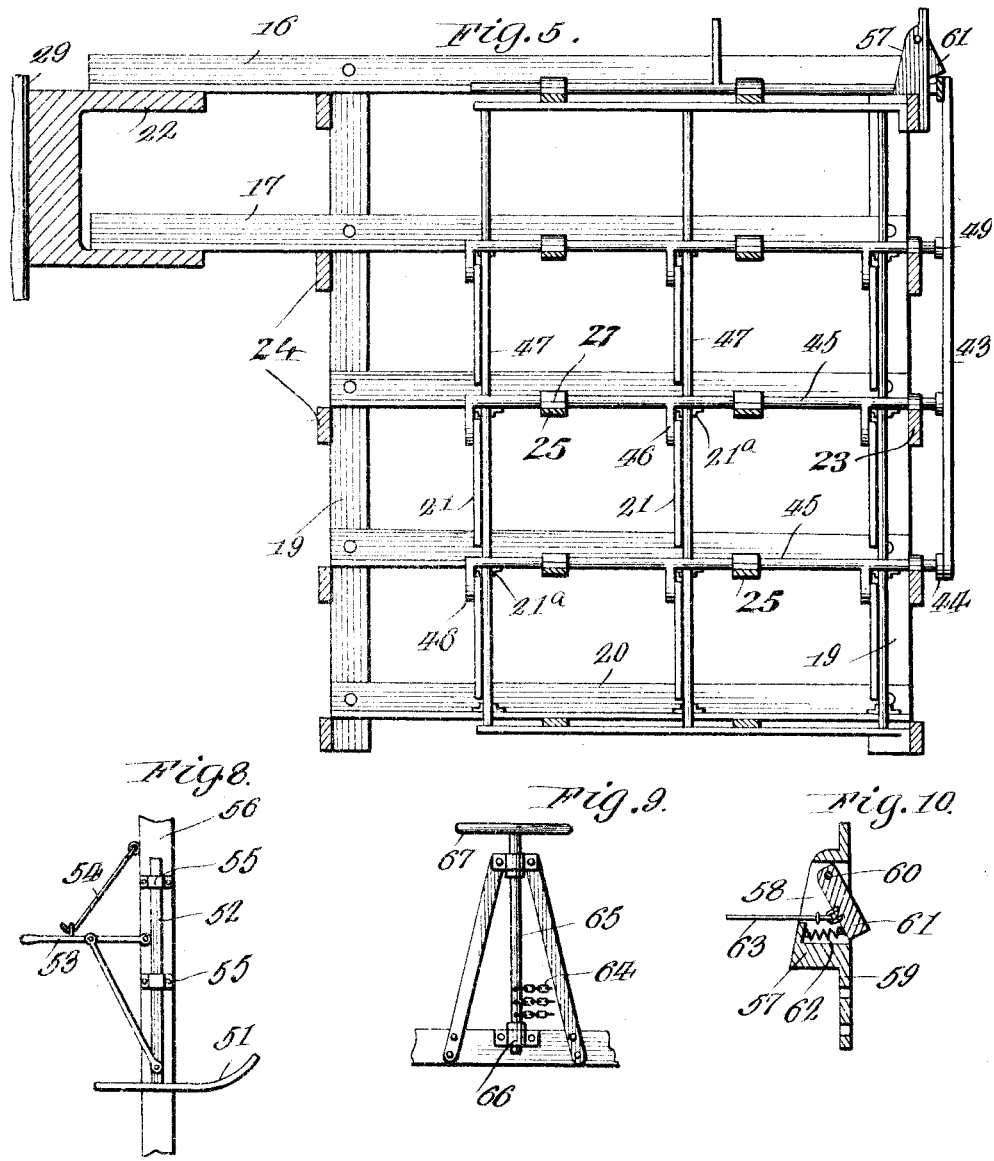

G. A. BJORNSON.
MOTOR WHEEL.
APPLICATION FILED DEC. 15, 1915.

1,198,410.

Patented Sept. 19, 1916
5 SHEETS—SHEET 5.

Witnesses
Guy K. Spring
C. P. Newbold

Inventor
Gustaf A. Bjornson
By Richard Owen,
Attorney

UNITED STATES PATENT OFFICE.

GUSTAF A. BJORNSON, OF SAN FRANCISCO, CALIFORNIA.

MOTOR-WHEEL.

1,198,410.  Specification of Letters Patent.  Patented Sept. 19, 1916.

Application filed December 15, 1915. Serial No. 64,031.

*To all whom it may concern:*

Be it known that I, GUSTAF A. BJORNSON, a subject of the King of Sweden, residing at San Francisco, in the county of San Francisco and State of California, have invented certain new and useful Improvements in Motor-Wheels, of which the following is a specification.

This invention relates to power or motor wheels of that type as are adapted to be suspended or mounted in the path of moving fluids, in order that the power of the moving fluids may be transmitted by them to some point of use.

As a principal object, it is contemplated by this invention to provide a wheel particularly adapted for use in a stream having a comparatively swift current, the impact of the flowing water against suitable blades provided by the wheel serving to propel the latter and generate a power readily transmissible.

It is a generic object of this invention to provide a wheel of such generally adaptive structure as to permit of its being employed to generate power from the movement of other fluids in addition to that of a stream, it being possible to equip the wheel of this invention either as a windmill or as a current motor.

More specifically, it is an object of this invention to provide a series of blades associated in radially arranged groups about the hub of the wheel, such blades being hingedly mounted and being free to meet the impact of the moving fluids in such manner as to determine a rotation of the wheel in a constant direction.

A further specific object of the invention is to provide means readily operable from a single point to secure the locking of all of the blades in such manner that rotation of the wheel will be checked, while at the same time the locked blades or wings do not form obstruction to the passage of the current.

The above and additional objects which will be hereinafter more specifically treated are accomplished by such means as are illustrated in the accompanying drawings, described in the following specification and then more particularly pointed out in the claims which are appended hereto and form a part of this application.

Figure 1:
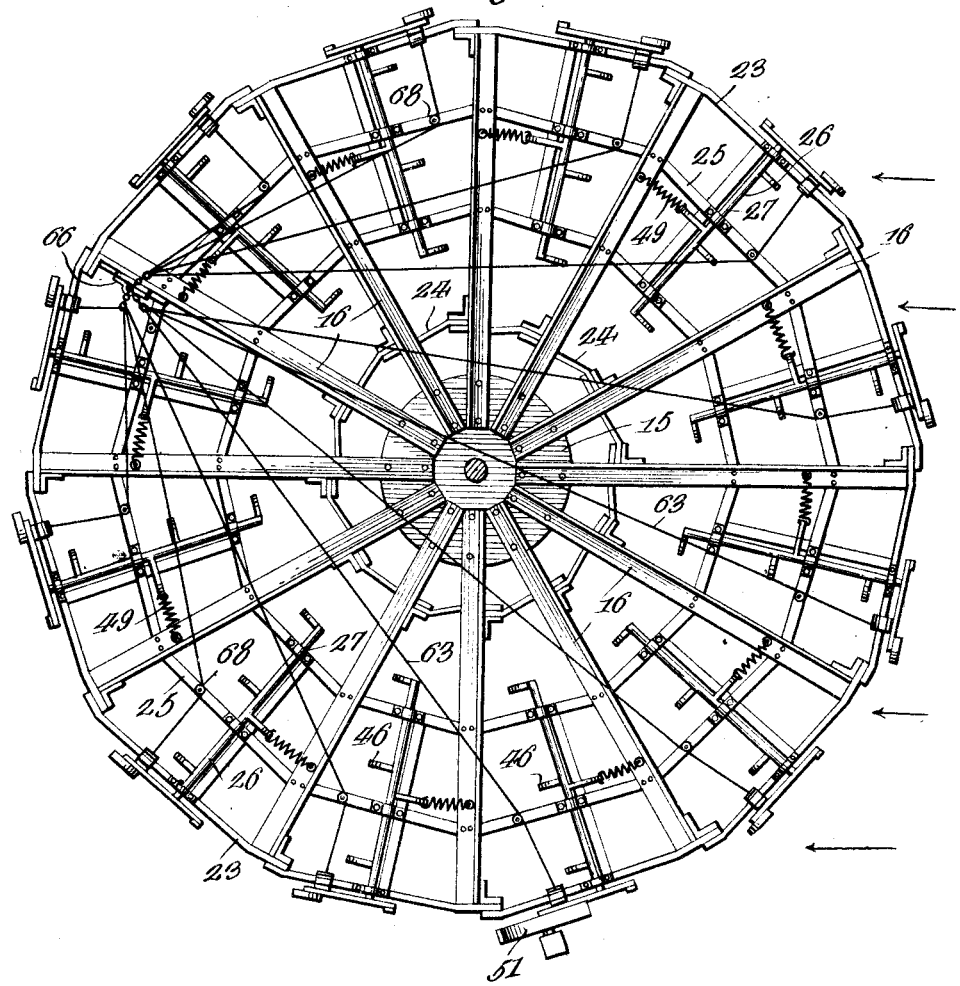
Figure 2:
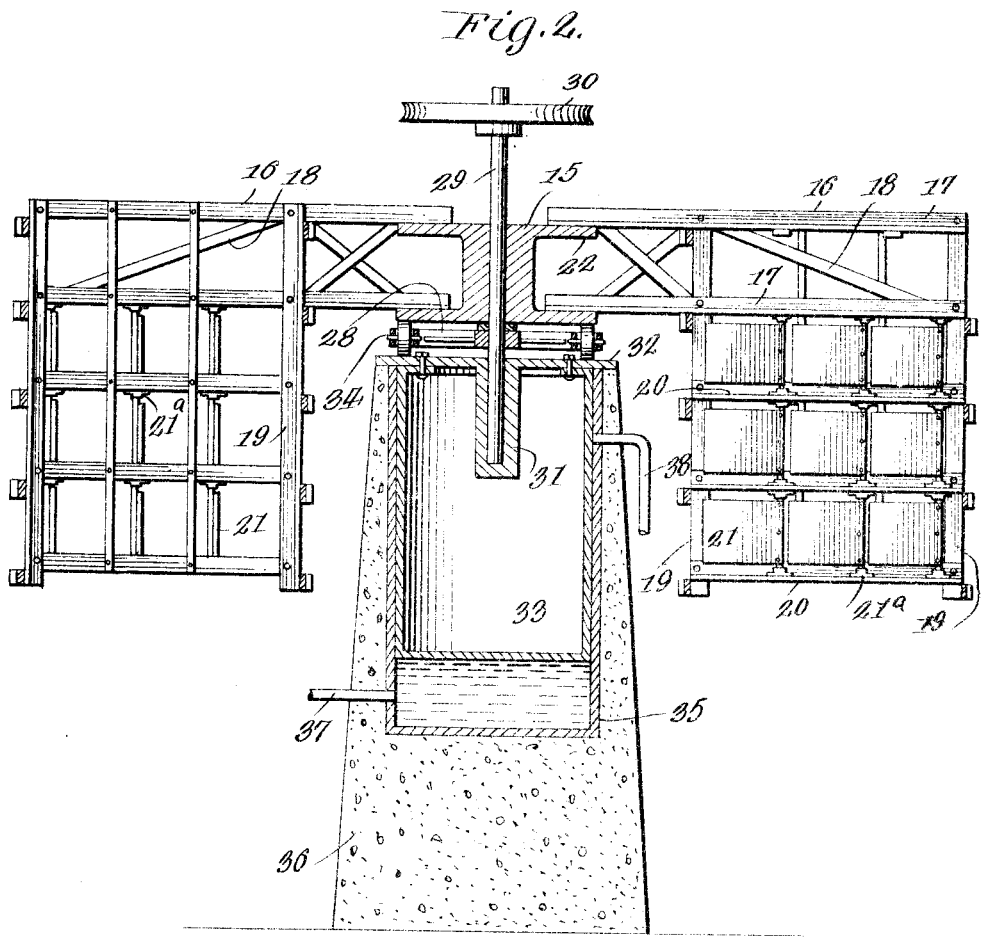
Figure 6:
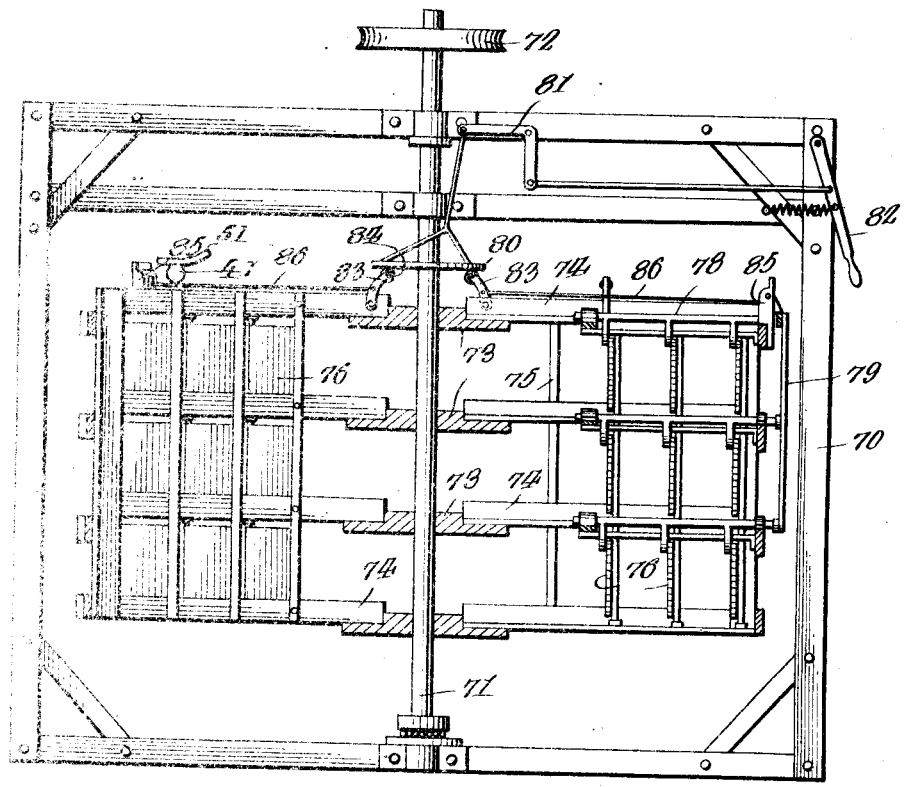
Figure 7:
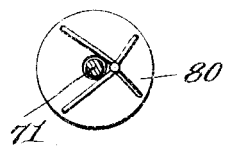

With reference to the drawings, wherein there is illustrated the preferred embodiment of this invention as it is reduced to practice, and throughout the several views of which like characters of reference designate similar parts:—Figure 1 is a plan view of a power wheel such as is comprehended by the present invention; Fig. 2 is a vertical diametrical section therethrough, showing the method of mounting the wheel as a current motor; Fig. 3 is an enlarged detail of the method of mounting a number of the freely movable wings, showing the locking control therefor; Fig. 4 is a view of the wheel as it is undergoing the operation of having its wings locked; Fig. 5 is an enlarged view similar to Fig. 2, but showing the wings in their locked position; Fig. 6 is a view illustrating a modified form of wheel, locking control and mounting frame; Fig. 7 is a detail of the release shown in Fig. 6; Fig. 8 is a detail of the shoe employed to control the locking operation illustrated in Fig. 4; Fig. 9 is a detail of the method of releasing the previously locked wings, and Fig. 10 is a sectional view showing the automatically set detent, release of which frees the wings for movement.

As shown in Fig. 1 of the drawings, the wheel includes broadly a hub 15 having a number of spoke frames 16 radiating therefrom uniformly. These spokes as well as the majority of the spoke frame structure to be later set forth, are of an angle iron construction imparting the desired rigidity to the spoke frames without obstructing the passage of the fluid generating power for the wheel. Each of these spoke frames includes a pair of parallel members 17 suitably braced by means 18 and having separating therefrom at right angles a similar pair of parallel members 19 which are connected by a plurality of cross bars 20 forming the mounting structure for the movable wings. Each of these includes a blade 21 of substantially rectangular formation formed at a pair of pivotal corners with suitable trunnions adapted to be received within bearings 21' supported by the various cross bars in the manner shown to advantage in Fig. 2. It is understood that these wings or blades are freely movable except when their action is limited by locking means to be hereinafter set forth.

The spoke frames 16 arranged about the hub 15 are supported upon the annular flanges 22 of the latter and are connected by a circumferentially arranged series of braces 23 and 24, respectively connecting the ends and the intermediate portions of corresponding members 17 of adjacent spoke frames. In addition to these bracing means a number of connecting strips 25 also join the adjacent spoke frames, forming a means whereby locking shafts 26 may be suitably supported in the bearings 27 carried by these strips. The particular operation of these shafts 26 will be later set forth in detail.

The central hub 15 of the wheel is supported upon a table 28 and is splined or keyed upon a transmission shaft 29 the outer extremity of which carries the transmission pulley 30. The lower extremity of the shaft 29 is journaled within a suitable socket 31 formed integrally with a cover plate 32 for the mounting cylinder 33 of the wheel, such cover also forming the platform upon which the table 28 is rotatable through the medium of the roller bearings 34 journaled at intervals in the periphery of the table.

The mounting cylinder 33 for the wheel is snugly received within the hydraulic cylinder 35, the latter cylinder being inserted within a suitable pier of concrete or a like material which may be built directly upon the bed of the stream or mill race furnishing the current to operate the wheel. The hydraulic cylinder 35 is larger than the mounting cylinder 33 for the wheel and has the space therebetween filled with water or other fluid admitted through an inlet 37. Control of the hydraulic fluid admitted between the cylinders may be assured by any desirable valve means, so that the wheel may be raised entirely out of the stream for repair purposes should it be so desired. The water within the cylinders may be either exhausted through the inlet 37 or driven out through a suitable check flow outlet 38.

Returning to the description of the locking means for the wings 21 reference is directed primarily to Figs. 3 and 4. In these views the shaft 26 illustrated, a type of all similar shafts, carries at its outer extremity a lever 39 having an arcuately upturned extremity 40 upon which is mounted a roller 41. The opposite end of this lever makes pivotal connections 42 with a vertical rod 43. Crank members 44 pivotally connect the vertical rod with separate rock shafts 45 vertically alined with the controlling shaft 26 as is clearly shown in Fig. 4. Each of these rock shafts carries a plurality of crank extensions 45 which are so spaced therealong as to contact with proper blades 21 in the manner best shown in Fig. 3, and preventing clockwise movement of the blades. Counterclockwise movement is always denied these blades by the employment of rods 47 for this purpose. An upstanding arm 48 is formed upon each controlling shaft 26 for the connection therewith of a contractile coil spring 49, the opposite extremity of the spring being fastened, as denoted at 50 to the brace 16 of the spoke frame mounting the wings 21 controlled by the particular shaft 26 under discussion. It will thus be seen that the spring normally tends to prevent any locking of the blades and tends to return the blades to their position of release as soon as the locking force is removed. Movement of each controlling shaft 26 under influence of its spring 49, is limited by a stop pin 39' projecting from one of the braces 23 and beneath the short end of the lever 39 for said controlling shaft.

To lock the blades of the respective spoke frames there is employed a shoe 51 which is preferably mounted at the extremity of a rod 52, control of the rod being assured through the medium of the lever 53 and any suitable catch connections 54. The rod slides through brackets 55 secured to a support member 56 and usually bears such relation to the wheel as is illustrated, somewhat diametrically in Fig. 1. It will be noted that this shoe is so positioned with respect to the wheel periphery as to be within the path of travel of each of the roller tipped extremities of the levers 39. It will be apparent, from an inspection of Fig. 4 that each lever coming in contact with the shoe is depressed from its normal position and against the resiliency of its spring 49. If no other means were employed to lock levers in this depressed position, they would be immediately returned to the position of release by the springs 49. It is proposed however, to employ detents of the character particularly illustrated in Fig. 10.

It will be seen that the preferred form of detent includes a casing 57 formed with a central slot 58 and having a suitable securing flange 59 whereby the casing may be bolted to braces 23 adjacent each lever 39, Fig. 3 showing the relation of the detent casing to the lever when properly positioned. Pivoted within the casing as denoted by the numeral 60 is a dog 61 normally maintained in the projecting position, as regards the slotted casing, as is illustrated in Fig. 10, owing to the action of the expansible coiled spring 62. Flexible connections 63 afford a means whereby a control of the detents against the action of these springs 62 may be assured. As shown in Fig. 1, these flexible connections 63 to the detent of each spoke frame are led to a common point, either directly or through the medium of the collecting chains 64, these chains or the flexible connections directly having one extremit secured to a shaft 65 mounted at some suitable point, preferably near the periphery of the wheel, in brackets 66. A hand wheel 67 controls the shaft 65 which may thus be rotated in one direction if it is desired to withdraw the detents 61 from their projecting positions. Pulleys 68 are employed wherever desirable to properly direct the action of the flexible connections 63.

In operation, the preferred form of the invention which above has been described in the foregoing is operated through the medium of the hydraulic cylinders and lowered into contact with the flowing current of the stream. Presuming that the blades are not locked the wheel will be given rotation inasmuch as the contact of the blades with the particularly arranged braces of each spoke frame serves to present broad flat surfaces of resistance against the action of the current upon one side of the wheel, while upon the opposite side of the wheel the blades bend from a streaming movement by reason of the need of lying in a changed angle in order to relieve the stress where the final forces down into the rotating position illustrated to the right of Fig. 2. The movement of these wings is therefore limited at opposite points of a 360 arc, one of the points of the arc being above the blades after the working or resistance and the other point of the arc being below the blades after the movement of no resistance.

When it is desired to lock the blades against movement even in the limited degree given the wheel as accomplished by rotation of the controlling rock-shaft 55 to force into the path of the arm 58 of each lever 57 respectively in precession the roller 62 and into contact with the arm. As each of these levers is impressed upon then the bent 56 of which normally tends to project from the spring 59 is forced inwardly by this downward pressure of the lever until the latter has passed below the detent, whereupon the spring 59 forces the detent outwardly from its closed casing and prevents any return of the lever 58 to its normal position through the spring 59. The arms of each spoke frame will thus be effectively locked until all are locked, preventing any rotation of the wheel in response to the action of the current, inasmuch as the resistance to rotate in one direction will balance the resistance to rotation in the opposite direction. Manipulation of the controlling shaft 65 through the medium of the hand wheel 67 will withdraw the respective detents 61 from contact with their levers and permit a release of all of the wing blades in respective series simultaneously, again permitting rotation of the wheel.

The modified form illustrated in Figs. 6 and 7 comprises an inclosing frame 70 which may be lowered into and supported in the current in any desirable manner. A central shaft 71 is mounted in the best antifrictional manner possible and carries at its upper extremity the transmission pulley 72 while intermediately upon the shaft are secured the separate wheel hubs 73. Each one of these wheel hubs carries a number of radiating spokes 74 which are vertically alined with the corresponding spokes of the remaining hubs through the medium of framing bars 75. In the spoke frames thus provided blades 76 of the usual character are mounted and in such manner as to have the type of movement previously discussed. The control, however, for locking these blades varies little in the modified form, shafts 78 being suitably connected for the tiers of blades within each radial spoke frame through the medium of links 79 in substantially the same manner as has already been set forth. For an operating means there is employed the shoe 51 already disclosed. For unlocking of the locked blades there is employed a plate 80, having connections with a bell crank 81 which is in turn normally operable by a hand lever 82 pivoted to a suitable portion of the frame 70. Levers 83 also tipped at their extremities with rollers 84 are carried by each radial spoke frame and connections between these levers and detents denoted 85 and of the character already set forth are made by rods 86.

In operation, rotation of the wheel is assured in the same manner as of the first described form of wheel. Locking of the wheel to prevent rotation is accomplished by permitting depression of the rollers tipping levers of shafts 78 in succession, so that the detents 85 may prevent their return, the rock shafts 78 being formed with upon the rock extension contacting with the wings, and at their outer extremities a lever upon which is mounted a roller 41. Release of the blades from their locked position is accomplished by a lowering of the plate 80 into contact with the roller tipped extremities of the levers 83. Depressing these levers and consequently exerting a pull upon connections 86 which will withdraw the various detents from their normal position and permit the rise of the levers of shafts 78 and the consequent unlocking of the several blades 76.

The form shown in the modification of Fig. 6 has also been found to be particularly desirable as a windmill structure, when the generating fluid is air and not the water of a stream. Other modifications of both the structures shown, in order to adapt either form of power wheel to varying exigencies may be undertaken by the present inventor for the satisfaction of conditions not here particularly specified, in accordance with the scope of the appended claims.

What is claimed is:—

1. A power wheel including a hub, spoke frames radially mounted by the hub, blades pivoted to each spoke frame, and means for locking all of the blades in each spoke frame in succession, against pivotal movement.

2. A power wheel including a hub, spoke frames radiating from the hub, wings pivoted to each spoke frame, means restricting the rotational movement of the wings, and means for locking the wings of each spoke frame in succession against any rotational movement.

3. A power wheel including a hub, spoke frames rotated from said hub, a series of wings pivoted to each spoke frame, a locking shaft for the wings of each spoke frame, means resisting the action of each locking shaft, and means disposed adjacent the path of rotation of the wheel for overcoming the resisting means of each frame in succession.

4. A power wheel including a hub, spoke frames radiating from the hub, blades pivoted in each spoke frame, a locking shaft for the blades of each spoke frame, spring means resisting the action of each locking shaft, and means disposed adjacent the path of rotation of the wheel for overcoming the spring means of each frame in succession.

5. A power wheel including a hub, spoke frames radiating from the hub, blades pivoted in each spoke frame, a locking shaft for the blades of each spoke frame, spring means resisting the action of each locking shaft, means disposed adjacent the path of rotation of the wheel for overcoming the spring means of each frame in succession, and detent means carried by each frame for locking the shaft thereof in its wing locking position after the action of the last said means.

6. A power wheel including a hub, spoke frames radiating from the hub, blades pivoted in each spoke frame, a locking shaft for the blades of each spoke frame, spring means resisting the action of each locking shaft, means disposed adjacent the path of rotation of the wheel for overcoming the spring means of each frame in succession, detent means carried by each frame for locking the shaft thereof in its wing locking position after the action of the last said means, and means for simultaneously releasing the detents of all of the spoke frames.

7. A power wheel including a hub, spoke frames rotated from said hub, a series of blades pivoted in each spoke frame, rods carried by each frame to limit the rotational arc of said blades, a rock shaft supported by each frame, means actuated by said rock shafts to act in conjunction with certain of said rods in locking all of the blades in each frame against any rotational movement, and means to operate the rock shafts in succession.

8. A power wheel including a hub, spoke frames radiating from the hub, drive blades pivoted to each spoke frame, a hydraulic cylinder, a cylinder operated thereby, and antifrictional means between the second cylinder and said wheel hub.

9. A power wheel including a hub, spoke frames radiating from the hub, blades pivoted in tiers upon each spoke frame, a rock shaft for each tier of blades, extensions carried by each rock shaft to contact with the blades in preventing movement thereof, a shaft for simultaneous actuation of all the rock shafts of each frame, and resilient means connected to the actuating shaft and normally resisting movement thereof, and means for controlling the actuating shafts.

10. A power wheel including a hub, spoke frames radiating from the hub, blades pivoted in tiers upon each spoke frame, a rock shaft for each tier of blades, extensions carried by each rock shaft to contact with the blades in preventing movement thereof, a shaft for simultaneous actuation of all the rock shafts of each frame, resilient means connected to the actuating shaft and normally resisting movement thereof, and a shoe disposed adjacent the path of rotation of said spoke frames and adapted to operate the actuating levers of each of these spoke frames in succession to lock the blades thereof against the action of said resilient means.

11. A power wheel including a hub, spoke frames radiating from the hub, blades pivoted in tiers upon each spoke frame, a rock shaft for each tier of blades, extensions carried by each rock shaft to contact with the blades in preventing movement thereof, a shaft for simultaneous actuation of all the rock shafts of each frame, resilient means connected to the actuating shaft and normally resisting movement thereof, a shoe disposed adjacent the path of rotation of said spoke frames and adapted to operate the actuating levers of each of these spoke frames in succession to lock the blades thereof against the action of said resilient means, and detent means spring operated to maintain each of the actuating shafts in its locked position after the initial operation of said shoe.

12. A power wheel including a hub, spoke frames radiating from the hub, blades pivoted in tiers upon each spoke frame, a rock shaft for each tier of blades, extensions carried by each rock shaft to contact with the blades in preventing movement thereof, a shaft for simultaneous actuation of all the rock shafts of each frame, resilient means connected to the actuating shaft and normally resisting movement thereof, a shoe disposed adjacent the path of rotation of said spoke frames and adapted to operate the actuating levers of each of these spoke frames in succession to lock the blades thereof against the action of said resilient means, detent means spring operated to maintain each of the actuating shafts in its locked position after the initial operation of said shoe, and flexible connections running from a common point on the wheel to each of the spoke frame detents for the simultaneous disengagement of the various spoke frame blades.

In testimony whereof I affix my signature in presence of two witnesses.

GUSTAF A. BJORNSON.

Witnesses:
E. P. SCHMIDT,
J. E. HARPER.